United States Patent
Jeong et al.

(10) Patent No.: US 12,506,529 B2
(45) Date of Patent: Dec. 23, 2025

(54) AUTOMATIC SWITCHING COMMUNICATION METHOD AND AUTOMATIC SWITCHING COMMUNICATION DEVICE USING DIRECTIONAL ANTENNAS

(71) Applicants: Ubitech Co., Ltd., Daejeon (KR); Korea Institute of Ocean Science & Technology, Busan (KR)

(72) Inventors: Nahk Ju Jeong, Daejeon (KR); Jong Kyoun Seo, Daejeon (KR); Woo Seong Shim, Daejeon (KR); Bu Young Kim, Daejeon (KR)

(73) Assignees: KOREA INSTITUTE OF OCEAN SCIENCE & TECHNOLOGY, Busan (KR); UBITECH CO., LTD., Daejeon (KR)

(*) Notice: Subject to any disclaimer, the term of this patent is extended or adjusted under 35 U.S.C. 154(b) by 85 days.

(21) Appl. No.: 18/493,170

(22) Filed: Oct. 24, 2023

(65) Prior Publication Data
US 2024/0137095 A1  Apr. 25, 2024
US 2024/0235647 A9  Jul. 11, 2024

(30) Foreign Application Priority Data
Oct. 25, 2022  (KR) .......................... 10-2022-0138495

(51) Int. Cl.
H04B 7/06   (2006.01)

(52) U.S. Cl.
CPC ......... *H04B 7/0691* (2013.01); *H04B 7/0602* (2013.01)

(58) Field of Classification Search
CPC ............................ H04B 7/0691; H04B 7/0602
See application file for complete search history.

(56) References Cited

U.S. PATENT DOCUMENTS

2013/0137435 A1* 5/2013 Shi .................... H04W 36/0085
  455/450
2013/0322260 A1* 12/2013 Yao ........................ H04W 24/10
  370/241

(Continued)

FOREIGN PATENT DOCUMENTS

KR  20040008988 A  1/2004
KR  20220129438 A  9/2022

OTHER PUBLICATIONS

Jeong Nahkju "A Study on the Router System for High-Speed Maritime Wireless Communication" Department of Computer Engineering, Garduate School of Paichai Universit Daejeon, KKorea, Dec. 2017.

*Primary Examiner* — Janice N Tieu
(74) *Attorney, Agent, or Firm* — Harness, Dickey & Pierce, P.L.C.

(57) ABSTRACT

Disclosed is an automatic switching communication method including: obtaining LTE communication state information of a main communication module for communicating with outside through a directional antenna and a sub-communication module for communicating with the outside through a directional antenna; registering the LTE communication state information of the main communication module and the sub-communication module in a routing table; determining whether the main communication module and the sub-communication module are capable of performing LTE communication; and comparing with pre-specified communication quality coefficients of the main communication module and the sub-communication module to adjust a routing path.

5 Claims, 7 Drawing Sheets

(56) References Cited

U.S. PATENT DOCUMENTS

2014/0213265 A1* 7/2014 Agarwal ............... H04W 40/24
                                                        455/445
2019/0098367 A1* 3/2019 Jung ..................... H04L 45/24
2022/0131560 A1* 4/2022 Zhang .................. H04B 1/0057

* cited by examiner

AUTOMATIC SWITCHING COMMUNICATION METHOD AND AUTOMATIC SWITCHING COMMUNICATION DEVICE USING DIRECTIONAL ANTENNAS

CROSS REFERENCE TO RELATED APPLICATION

The present application claims priority to Korean Patent Application No. 10-2022-0138495, filed 25 Oct. 2022, the entire contents of which is incorporated herein for all purposes by this reference.

BACKGROUND OF THE INVENTION

Field of the Invention

The present disclosure relates to an automatic switching communication method and an automatic switching communication device using directional antennas.

Description of the Related Art

LTE-M is a communication network that enables very high-speed data communication up to 100 km above sea level, and provides navigation services to traveling ships or aircraft. In addition, LTE-M may also function as a maritime disaster network for search, rescue response, and securing the golden hour in case of maritime accidents.

Maritime LTE has evolved into a national network and a commercial network. In the case of the national network, an LTE network used for the safety of ships has been established as a disaster network by the government. Recently, as a basis for providing an intelligent maritime traffic information service (e-Nav) to ships sailing up to 100 km from the coast, a wireless communication network (maritime LTE, LTE-M) that introduces LTE communication technology at sea has been established. Maritime LTE provides real-time customized maritime safety information to ships located 100 km away through streaming services. This enables maritime navigation (e-navigation) services. Maritime navigation may provide maritime navigation, traffic situations, and weather information to ships over the LET network.

In the case of the commercial network, the maritime coverage of a commercial LTE network, which used to be with about 30 km from the coast, has recently expanded to a maximum of 200 km. Use of Over The Horizon Antenna Distribution (OTHAD) technology can expand the maritime LTE coverage up to 200 km without repeaters. OTHAD is a technology that automatically adjusts synchronization timing between a terminal and a base station depending on the distance, thus increasing the accuracy of data transmission and reception even over long distances.

The foregoing is intended merely to aid in the understanding of the background of the present disclosure, and is not intended to mean that the present disclosure falls within the purview of the related art that is already known to those skilled in the art.

DOCUMENT OF RELATED ART (Patent Document 1) Korean Patent Application Publication No. 10-2004-0008988 (31 Jan. 2004)

SUMMARY OF THE INVENTION

An automatic switching communication method and an automatic switching communication device using directional antennas are intended to increase communication efficiency in surroundings, such as aircraft or special ships, where LTE antennas and devices cannot be installed outside and the reception of LTE signals inside is inefficient due to the peculiarities of the structure.

In the above-described surroundings, there are cases in which radio waves are received only through small windows. In these cases, communication efficiency is increased by performing communication with a directional antenna capable of transmitting and receiving radio waves in only one direction, which is the purpose of the present disclosure.

There is a need for a method and device that can increase communication efficiency by performing communication with a directional antenna and determining a communication module capable of communication, among two communication modules or a plurality of communication modules.

It is to be understood that technical problems to be solved by the present disclosure are not limited to the aforementioned technical problems and other technical problem which are not mentioned will be apparent from the following description to those skilled in the art.

According to an embodiment of the present disclosure, there is provided an automatic switching communication method including: obtaining LTE communication state information of a main communication module for communicating with outside through a directional antenna and a sub-communication module for communicating with the outside through a directional antenna; registering the LTE communication state information of the main communication module and the sub-communication module in a routing table; determining whether the main communication module and the sub-communication module are capable of performing LTE communication; and comparing with pre-specified communication quality coefficients of the main communication module and the sub-communication module to adjust a routing path.

In addition, an LTE interface of the main communication module may be set to have a higher priority than an LTE interface of the sub-communication module.

In addition, the main communication module may be electrically connected to the sub-communication module through a wide area network (WAN).

In addition, the sub-communication module may have a demilitarized zone (DMZ) setting function of transmitting an external connection request to the main communication module.

According to another embodiment of the present disclosure, there is provided an automatic switching communication device controlled by a processor, the automatic switching communication device including: a main communication module for communicating with outside through a directional antenna; and a sub-communication module for communicating with the outside through a directional antenna, wherein the processor is configured to obtain LTE communication state information of the main communication module and the sub-communication module, register the LTE communication state information of the main communication module and the sub-communication module in a routing table, and compare with pre-specified communication quality coefficients of the main communication module and the sub-communication module to adjust a routing path.

In surroundings such as aircraft or special ships where LTE antennas and devices cannot be installed outside and the reception of LTE signals inside is inefficient due to the peculiarities of the structure, two communication modules are installed and the two communication modules attempt LTE communication simultaneously and the module capable of communication is selected according to conditions, thereby increasing the efficiency of communication with a user terminal.

In addition, the two communication modules communicate with each other, and it is determined which device will actually communicate with a user terminal, thereby increasing communication efficiency.

The effects of the present disclosure are not limited to the effects described above, and may be expanded in various ways without departing from the spirit and scope of the present disclosure.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

In describing embodiments of the present disclosure, if it is decided that a detailed description of the known art related to the present disclosure makes the subject matter of the present disclosure unclear, the detailed description will be omitted. Further, the terms described below are defined in consideration of the functions in the present disclosure, and may be changed depending on the intention of a user, an operator, or a usual practice. Therefore, the definition should be based on the contents throughout this specification. The terms used below are merely for describing the embodiments of the present disclosure, and should not be restrictively interpreted. Unless clearly used otherwise, a singular expression includes a plural meaning. In the description, the expressions "include" or "have" are for indicating any features, numbers, steps, operations, elements, or a part or combination thereof, and should not be interpreted as excluding presence or possibility of one or more other features, numbers, steps, operations, elements, or a part or combination thereof other than the above.

In each system shown in the drawings, elements in some cases may have same or different reference numerals to suggest that the elements could be different or similar. However, elements may have different implementations and work with some or all of the systems shown or described in the specification. The various elements shown in the drawings may be the same or different. It is random which one is referred to as a first element and which one is referred to as a second element.

In the specification, when one element "transmits" or "provides" data or a signal to another element, it means that the element transmits the data or signal directly to the other element or the element transmits the data or signal to the other element via at least one another element.

All or some steps of an automatic switching communication method according to an embodiment of the present disclosure may be realized by one physical or logical computing device, or may be realized by two or more physical or logical computing devices in a distributed manner.

According to an embodiment of the present disclosure, an automatic switching communication device, which is a computing device capable of performing an automatic switching communication method may be realized with a processor, a memory, and a communication module. However, no limitation thereto is imposed, and an example of a realized device may be a server.

The "server" may include a DB that refers to a functional and structural combination of software and hardware in which information corresponding to each database is stored. The DB may be realized as at least one table, and may further include a separate database management system (DBMS) for searching for, storing, and managing information stored in the database. In addition, the DB may be realized in various forms, such as linked-list, tree, and relational databases, and may include any data storage media and data structures capable of storing information corresponding to the database. Hereinafter, a description will be made using the processor or the server as a subject.

Hereinafter, specific embodiments of the present disclosure will be described with reference to the accompanying drawings. The detailed description below is provided to help comprehensive understanding of methods, devices, and/or systems described in the present specification. However, the detailed description is illustrative only, and the present disclosure is not limited thereto.

Figure 1:
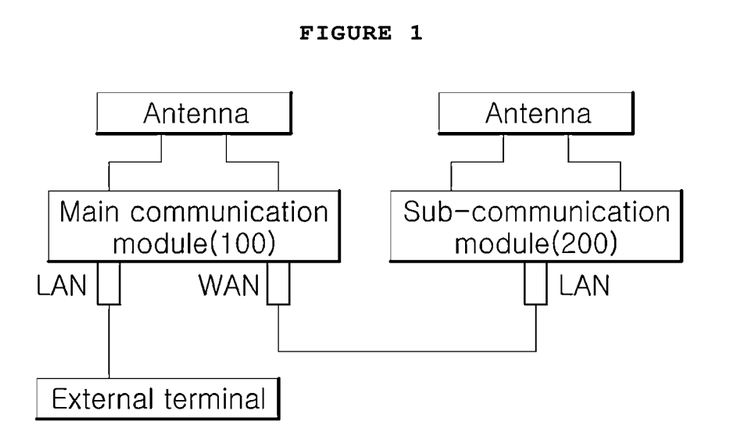
FIG. 1 is a schematic diagram illustrating an automatic switching communication device capable of performing an automatic switching communication method according to the present disclosure.

FIG. 1 is a schematic diagram illustrating an automatic switching communication device capable of performing an automatic switching communication method according to the present disclosure.

Referring to FIG. 1, the automatic switching communication device according to the present disclosure may include directional antennas capable of receiving LTE-M signals, a main communication module 100, and a sub-communication module 200. The main communication module 100 may be connected to a user terminal or an external terminal over a LAN. The sub-communication module 200 may be connected to the main communication module 100 over a WAN.

The main communication module 100 coordinates the entire communication of a system or a device, and is a device to which a user terminal is ultimately connected. The user terminal may be connected to only the main communication module among the two communication modules. In addition, the main communication module may perform LTE communication through an LTE communication modem, and may have two external connection ports, LAN and WAN ports.

The automatic switching communication device may determine in real time the interface to be connected to a user terminal or an external terminal through LTE communication through an LTE modem of the main communication module 100 and a communication module through the WAN connected to the sub-communication module 200.

The main communication module 100 may include the LTE modem for performing LTE communication, a GPS reception module for receiving GPS information, and a module for Wi-Fi communication. The main communication module 100 may support the LAN and WAN ports for Ethernet communication.

The LAN may support wired connection between a user terminal and the main communication module 100.

The WAN may be used for wired connection between the main communication module 100 and an external network. In the present disclosure, the WAN may be used to connect the sub-communication module 200 and the main communication module 100.

The Wi-Fi module may support Wi-Fi connection between a user terminal and the main communication module 100. The GPS module may receive GPS information. The received information may be transmitted to a user terminal, or may be used to transmit the location of the main communication module 100 to a monitoring server.

The main communication module 100 may support an operating system and a communication protocol of the automatic switching communication device through a combination of software and/or hardware.

The main communication module 100 may continuously monitor the state of the modem that is in charge of LTE communication, through a combination of software and/or hardware. In addition, the main communication module 100 may connect to an LTE communication network through modem settings. In addition, the main communication module 100 may collect and analyze communication state information and may transmit the same to a client requesting related information. The client may make a request to the main communication module 100 for information through TCP communication.

The GPS module may receive and analyze GPS information to determine whether location information is received normally at the location wherein the main communication module 100 is currently located. In addition, the GPS module may synchronize the time of the communication module with the GPS time.

The GPS module may transmit GPS information to a client requesting the information, and the client may perform server mode communication so as to connect to the GPS module through TCP communication. The GPS module may transmit current location information to the monitoring server when necessary.

The sub-communication module 200 may perform LTE communication connection through an LTE modem. The sub-communication module 200 may be connected to the main communication module 100 through a LAN interface, and may be connected to a WAN interface that is an external network of the main communication module 100. A user terminal is not connected to the sub-communication module 200, and the sub-communication module 200 may communicate only with the main communication module 100.

In addition, a user terminal connected to the main communication module 100 or a user that wants to access the main communication module 100 from outside may perform communication without knowing whether the sub-communication module 200 exists. This will be described in detail with reference to FIG. 5. That is, the sub-communication module 200 may serve as an external network connected to the WAN of the main communication module 100.

The sub-communication module 200 may include the LTE modem for performing LTE communication and a reception module for receiving GPS information. The sub-communication module 200 may support a LAN port for Ethernet communication.

The GPS module of the sub-communication module 200 may receive GPS information and transmit the same to the main communication module 100.

The LAN may support wired connection between the sub-communication module 200 and the main communication module 100.

A user terminal may be connected to the main communication module 100 and the main communication module 100 may support LAN/WAN and Wi-Fi with external interfaces. The sub-communication module 200 is not allowed to connect to an external terminal (e.g., a user terminal), and may be used only to provide a network to the main communication module 100.

Figure 2:
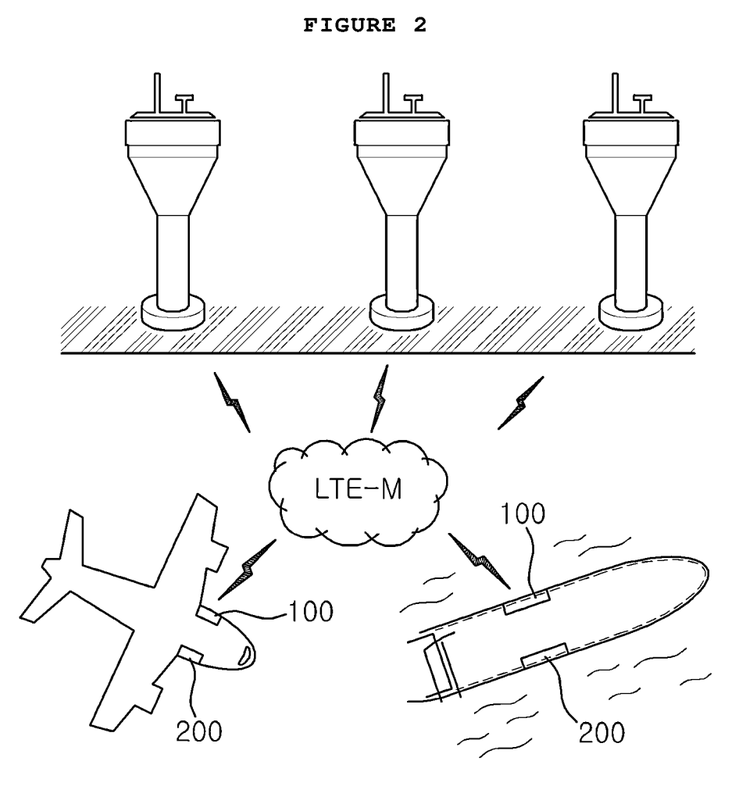
FIG. 2 is a conceptual diagram illustrating an environment to which an automatic switching communication method and an automatic switching communication device according to the present disclosure are applicable.

FIG. 2 is a conceptual diagram illustrating an environment to which an automatic switching communication method and an automatic switching communication device according to the present disclosure are applicable.

Referring to FIG. 2, the automatic switching communication method and the automatic switching communication device according to the present disclosure may be used in aircraft or ships traveling across the ocean.

An antenna of a general LTE communication device is designed to receive or transmit radio waves in directions of a 360 degree angle. However, in surroundings, such as an aircraft or a ship, where LTE antennas and devices cannot be installed outside and the reception of LTE signals inside is inefficient due to the peculiarities of the structure, the present disclosure may be used.

When the aircraft or the ship moves in one direction parallel to the seashore where base stations are installed, an antenna installed on the opposite side of the seashore is unable to receive radio waves efficiently. In addition, when the aircraft or the ship moves in the opposite direction, the location of an antenna capable of receiving radio waves efficiently may be reversed.

According to the present disclosure, in order to perform efficient LTE-M communication in the situation shown in FIG. 2, the main communication module 100 and the sub-communication module 200 are installed on the respective sides of the aircraft or ship facing each other, and the communication qualities of the main communication module 100 and the sub-communication module 200 are compared to perform automatic switching to the module with good communication quality.

In the present disclosure, a communication method using the main communication module 100 and a sub-communication module 200 is described as an example. However, another communication method and device that perform automatic switching communication with a plurality of communication modules installed at particular locations on an aircraft or ship rather than just two communication modules should be construed as being included in the technical idea of the present disclosure.

Figure 3:
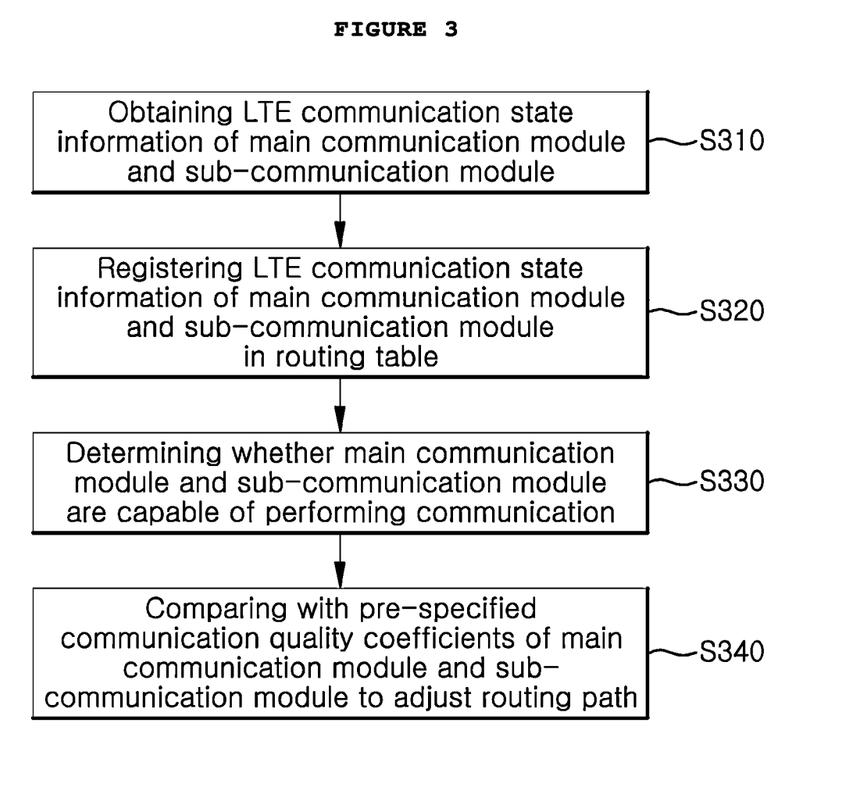
FIG. 3 is a flowchart illustrating the overall control flow of an automatic switching communication method according to the present disclosure.

FIG. 3 is a flowchart illustrating the overall flow of an automatic switching communication method according to the present disclosure.

Referring to FIG. 3, the automatic switching communication method according to the present disclosure may be performed by the automatic switching communication device, and may include: obtaining LTE communication state information of the main communication module 100 for communicating with the outside through a directional antenna and the sub-communication module 200 for communicating with the outside through a directional antenna in step S310; registering the LTE communication state information of the main communication module 100 and the sub-communication module 200 in a routing table in step S320; determining whether the main communication module 100 and the sub-communication module 200 are capable of performing communication in step S330; and comparing with pre-specified communication quality coefficients of the main communication module 100 and the sub-communication module 200 to adjust a routing path in step S340.

The step S310 of obtaining the LTE communication state information of the main communication module 100 for communicating with the outside through the directional antenna and the sub-communication module 200 for communicating with the outside through the directional antenna and the step S320 of registering the LTE communication state information of the main communication module 100 and the sub-communication module 200 in the routing table are the steps in which the automatic switching communication device according to the present disclosure obtains the communication state information of the LTE communication module connected to the main communication module 100 and the LTE communication module connected to the sub-communication module 200 and registers the respective pieces of the LTE communication state information in the routing table.

The networks of the main communication module 100 may include a LAN and Wi-Fi for internal networks, and LTE and a WAN for external networks. However, no limitation thereto is imposed. For example, the main communication module 100 may further include additional or external networks.

For example, like a general communication system, a network may be in a form that allows dynamic host configuration protocol (DHCP) and static IP address allocation. An LTE interface is set in a way specified by the LTE network, and may be set with the DHCP by default. In the case of the WAN, the WAN may be connected to the sub-communication module 200, so the WAN may be set in a way that a user wants. The automatic switching communication device according to the present disclosure uses static IP address allocation, so the connection between the main communication module 100 and the sub-communication module 200 may be checked at all times, and when other functions are performed, there is no need for the sub-communication module 200 to check the IP address allocated to the main communication module 100.

The automatic switching communication device according to the present disclosure may use two communication interfaces as interfaces for external networks, and the two communication interfaces may be configured to be registered in the routing table as default routers to allow routing. However, the priority of the LTE interface is set to be higher than that of the WAN interface, and the priority may be adjusted by setting a metric value in routing information. The lower the metric value, the higher the priority, and 0 may be the highest value.

The following shows the code for registration in the routing table according to an embodiment.

config interface "wan"
    option device "wan"
    option metric "1"
    option defaultroute "1"
    option proto "static"
    option gateway "192.168.102.1"
    option ipaddr "192.168.102.10"
    option netmask "255.255.255.0"
    option ip6assign "60"
    config interface "wan"
    option device "wwan0"
    option proto "dhcp"
    option metric "0"
    option defaultroute "0"
    option proto "static"
    option mtu "1450"

Herein, option device refers to an interface name, option metric refers to a routing priority, option defaultroute refers to default routing setting, option proto refers to an IP address allocation method, option gateway refers to a gateway address, option ipaddr refers to an allocated IP address, and option netmask refers to a network mask.

The step S330 of determining whether the main communication module 100 and the sub-communication module 200 are capable of performing communication and the step S340 of comparing with the pre-specified communication quality coefficients of the main communication module 100 and the sub-communication module 200 to adjust the routing path mean an auto switching method or the automatic switching communication method.

The automatic switching communication device according to the present disclosure may determine the priority of the interface by using the metric among the items described above in the auto switching method including the steps S330 and S340. That is, when several interfaces exist in the routing table in a routing possible state, the automatic switching communication device may adjust the routing path by prioritizing an interface with a low metric value. In the above-mentioned items, the WAN (connection to the sub-communication module) interface has the metric value of 1, which is greater than the metric value of 0 of the LTE interface, so the priority may be low. In other words, when the two interfaces are capable of routing, the LTE interface may be used first.

Figure 4:
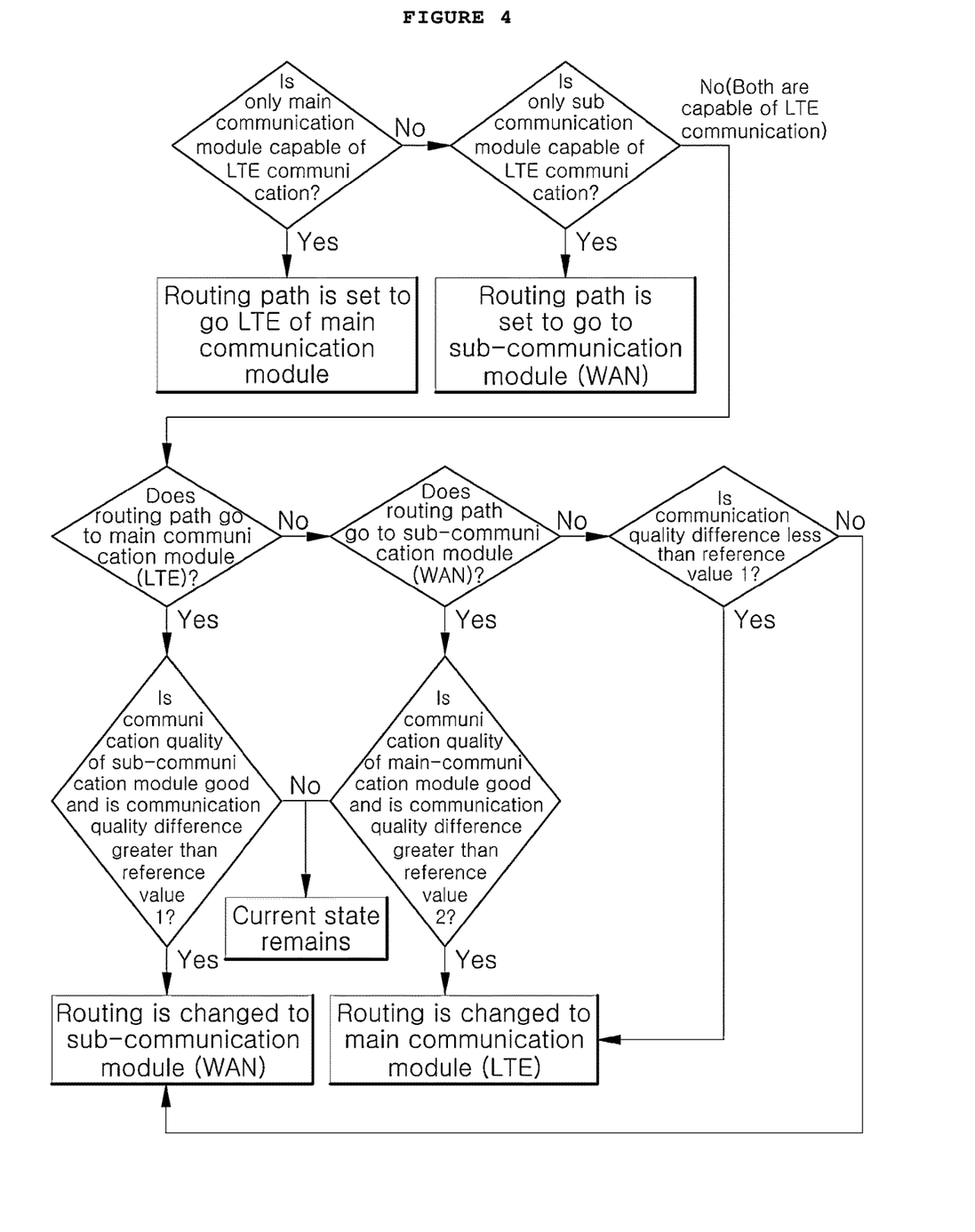
FIG. 4 is a more detailed flowchart illustrating an automatic switching communication method according to an embodiment.

FIG. 4 is a more detailed flowchart illustrating an automatic switching communication method according to an embodiment.

Referring to FIG. 4, in the auto switching method including the steps S330 and S340, when only the main communication module 100 is capable of LTE communication, the routing path may be set to go to LTE of the main communication module 100. Unless only the main communication module 100 is capable of LTE communication, it is determined whether only the sub-communication module 200 is capable of LTE communication. When only the sub-communication module 200 is capable of LTE communication, the routing path may be set to go to the sub-communication module 200 (WAN).

In the auto switching method including the steps S330 and S340, when both the main communication module 100 and the sub-communication module 200 are capable of LTE communication, it is determined whether the routing path goes to the main communication module 100. When the routing path goes to the main communication module 100, the state of the communication quality of the sub-communication module 200 is determined. When a communication quality difference is not greater than a preset reference value 1, the current state may remain. Herein, the reference value 1 is a value preset by a user and is a pre-specified communication quality coefficient and means a communication quality difference value for switching from the main communication module 100 to the sub-communication module

200. In addition, when the routing path goes to the main communication module 100 and the communication quality difference is greater than the preset reference value 1 after determining the state of the communication quality of the sub-communication module 200, the routing path may be changed to go to the sub-communication module 200 (WAN).

In the auto switching method, which may be expressed in the steps S330 and S340, it is determined whether the routing path goes to the main communication module 100. When the routing path does not go to the main communication module 100, it may be determined whether the routing path goes to the sub-communication module 200 (WAN). When the routing path goes to the sub-communication module 200, the state of the communication quality of the main communication module 100 is determined. When a communication quality difference is not greater than a preset reference value 2, the current state may remain. Herein, the reference value 2 is a value preset by a user and is a pre-specified communication quality coefficient and means a communication quality difference for switching from the sub-communication module 200 to the main communication module 100. In addition, when the routing path goes to the sub-communication module 200 and the communication quality difference is greater than the preset reference value 2 after determining the state of the communication quality of the main communication module 100, the routing path may be changed to go to the main communication module 100 (LTE).

In addition, in the auto switching method, which may be expressed in the steps S330 and S340, when the routing path goes to neither the main communication module 100 nor the sub-communication module 200, the communication qualities of the two communication modules are compared. When the communication quality difference is less than the reference value 1, the routing path is changed to go to the main communication module 100. When the communication quality difference is not less than the reference value 1, the routing path may be changed to go to the sub-communication module 200.

The automatic switching communication method according to the embodiment is a method of adjusting routing by automatically selecting a network with an excellent communication state between connection to an external network through the LTE communication module currently connected to the main communication module 100 and connection to an external network through the WAN interface connected to the sub-communication module 200.

The main communication module 100 registers the two communication interfaces in the routing table. The LTE communication module of the main communication module 100 is set to have a high priority and the WAN connected to sub-communication module 200 is set to have a low priority. However, this may result in unconditionally setting communication to the LTE interface when LTE communication of the main communication module 100 is possible regardless of communication quality.

The automatic switching communication method monitors the LTE communication quality of the main communication module 100 and the LTE communication quality of the sub-communication module 200 in real time. The automatic switching communication method compares the two communication qualities and may perform switching between the communication interfaces when the difference is equal to or greater than a set value.

The switching between the communication interfaces may be set by turning on/off LTE routing of the main communication module. The two interfaces are configured for routing, so all data is transmitted to the interface with a high priority. The LTE interface of the main communication module 100 has a high priority. Therefore, when the main communication module 100 determines that its LTE communication quality is excellent or when the automatic switching communication device determines that the LTE communication quality of the main communication module 100 is excellent, routing to the LTE interface is turned on. When it is determined that the LTE communication quality is lower than that of the sub-communication module 200, the LTE interface of the main communication module is turned off and the sub-communication module 200 is used.

Figure 5:
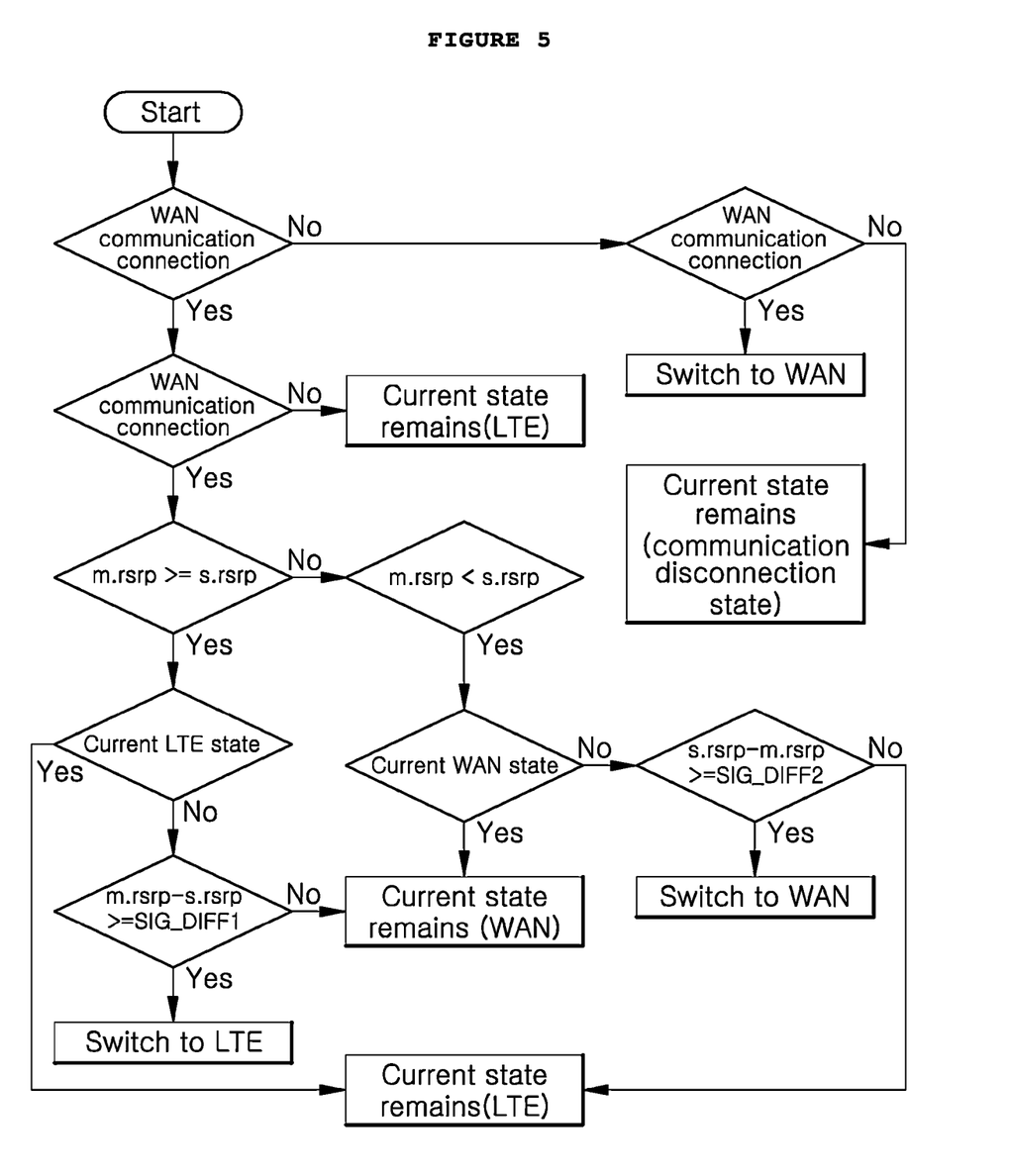
FIG. 5 is a more detailed flowchart illustrating an automatic switching communication method according to another embodiment.

FIG. 5 is a more detailed flowchart illustrating an automatic switching communication method according to another embodiment.

An automatic switching communication method or an auto switching method according to the present disclosure will be described in more detail. A main communication module 100 has interfaces that are capable of connecting to two external networks. One is an LTE interface and the other is a WAN interface connected to a sub-communication module 200. These are registered with priority in a routing table, so communication may be performed using the LTE interface with a high priority by default. However, between the two interfaces, an unintended quality difference may occur in the LTE network connection state or connection quality depending on a travel path of an aircraft or a ship.

Therefore, if a high-quality interface is found in real time and is connected to an external network, a smoother communication state may be maintained. The auto switching method according to the present disclosure is an interface automatic switching communication method for automatically finding and using an interface with better quality.

In order to perform automatic switching, it is necessary to determine an LTE communication state. In general, the most important parameter for determining a communication state in an LTE network is Reference Signal Received Power (RSRP). This value is the sensitivity of communication signals with a base station, and the communication quality determined using the value is mostly accurate. To this end, the main communication module 100 and the automatic switching communication device receive LTE communication information of the sub-communication module 200 in real time for monitoring. If unconditional switching to an interface with good communication quality is performed, repeated switching may occur in an area where a difference in sensitivity is small. To prevent this phenomenon, an appropriate margin is needed for a difference between values for switching.

Since the main communication module 100 has its own LTE interface, communicating using the interface is more stable than communicating through the sub-communication module 200, if possible. Assuming this situation, the main communication module 100 and the automatic switching communication device may perform switching to the sub-communication module 200. In addition, when the main communication module 100 and the automatic switching communication device perform switching to the sub-communication module 200, a difference in RSRP may be adjusted.

Table 1 below shows switching parameters and description.

TABLE 1

| Switching parameters | Description |
| --- | --- |
| RSRP (Reference Signal Received Power) | One of the important indicators of LTE communication quality<br>The strength of a signal originating from a base station and reaching a reception device |
| #define SIG_DIFF1 5 (default value) | When a difference in RSRP for switching from the sub-communication module to the main communication module, that is, a difference between the RSRP of the main communication module and the RSRP of the sub-communication module, is equal to or greater than the value, switching to the main communication module occurs. This value may be set by a user. |
| #define SIG_DIFF2 10 (default value) | When a difference in RSRP for switching from the main communication module to the sub-communication module, that is, a difference between the RSRP of the sub-communication module and the RSRP of the main communication module is equal to or greater than the value, switching to the sub-communication module occurs. This value may be set by a user. |

Switching may be performed on the basis of the above-described parameters. However, when only one of the two is capable of communication, switching is always made to the interface to which communication is connected. More detailed switching conditions and possible cases according to the parameters are shown in Table 2 below.

TABLE 2

| Communication states | Current states | Switching states |
| --- | --- | --- |
| LTE On, WAN Off | LTE | LTE (state remains) |
| LTE On, WAN Off | WAN | LTE (switching) |
| LTE Off, WAN On | LTE | WAN (switching) |
| LTE Off, WAN On | WAN | WAN (state remains) |
| LTE Off, WAN Off | LTE | LTE (state remains) |
| LTE Off, WAN Off | WAN | WAN (state remains) |
| LTE On, WAN On (m. rsrp >= s. rsrp) m. rsrp >= s. rsrp | LTE | LTE (state remains) |
| LTE On, WAN On (m. rsrp >= s. rsrp) (m. rsrp − s. rsrp) < SIG_DIFF1 | WAN | WAN (state remains) |
| LTE On, WAN On (m. rsrp >= s. rsrp) (m. rsrp − s. rsrp) >= SIG_DIFF1 | WAN | LTE (switching) |
| LTE On, WAN On (m. rsrp < s. rsrp) (s. rsrp − m. rsrp) < SGI_DIFF2 | LTE | LTE (state remains) |
| LTE On, WAN On (m. rsrp < s. rsrp) (s. rsrp − m. rsrp) < SGI_DIFF2 | WAN | WAN (state remains) |
| LTE On, WAN On (m. rsrp < s. rsrp) (s. rsrp − m. rsrp) >= SGI_DIFF2 | LTE | WAN (switching) |

Herein, m.rsrp refers to the LTE signal quality of the main communication module 100, s.rsrp refers to the LTE signal quality of the sub-communication module 200, LTE refers to the LTE interface of the main communication module 100, and WAN refers to the LTE interface of the sub-communication module 200.

The initial routing policy of the main communication module 100 and the automatic switching communication device prioritizes LTE. Therefore, auto switching starts with LTE set. The conditions in the table are expressed in a flow chart as shown in FIG. 5. SIG_DIFF1 and SIG_DIFF2 are variables that a user is allowed to set, and may be used as values for reducing the frequency of switching according to an environment while maintaining stable communication. SIG_DIFF2 and SIG_DIFF1 may refer to preset reference value 1 and preset reference value 2, respectively, which represent the above-described communication quality differences, and may mean pre-specified communication quality coefficients. Reference value 1 (SIG_DIFF2) is greater than reference value 2 (SIG_DIFF1).

Figure 6:
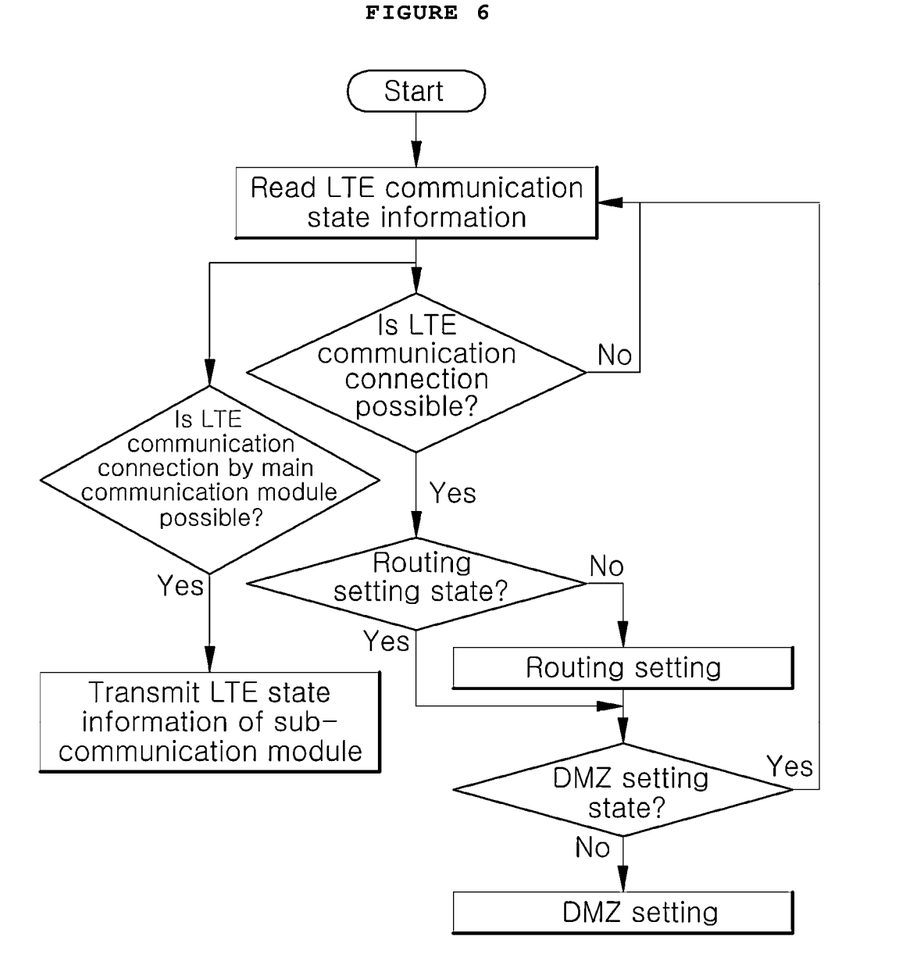
FIG. 6 is a flowchart illustrating a DMZ setting of a sub-communication module according to an embodiment.

FIG. 6 is a flowchart illustrating a DMZ setting of a sub-communication module according to an embodiment.

The sub-communication module 200 will be described in more detail. A user of an external network is unable to know the existence of the sub-communication module 200 of the present disclosure. That is, the main communication module 100 and the sub-communication module 200 may be regarded as one communication device in the external network. The main communication module 100 and the sub-communication module 200 may be distinguished as two devices in the device or system that actually handles the LTE network, but users simply using services recognize the main communication module 100 and the sub-communication module 200 as one device.

To this end, connection requests (e.g., management page of the communication device, and http connection) from an external network connected to the sub-communication module 200 are transmitted to the main communication module 100. To this end, the sub-communication module 200 may have a demilitarized zone (DMZ) setting. In the communication device, the DMZ is a function that bypasses all connection request ports coming to the communication device itself, to a specified IP (connected to the LAN of the sub-communication module). In the present disclosure, bypassing to the IP address of the main communication module 100 takes place.

The following shows the code of a DMZ setting according to an embodiment.

config redirect "dmz"
        option name "dmz"
        option target "DNAT"
        option src "wan"
        option dest "lan"
        option dest_ip "192.168.102.10"
        option scr_port "1-65535"
        option proto "tcp udp"
        option enabled "1"

The networks of the sub-communication module 200 include a LAN for an internal network, and LTE for an external network. Like a general communication system, the internal network may in a form that allows DHCP and static IP address allocation. The LTE interface, the external network, is set in a way specified by the LTE network, and may be set with the DHCP by default.

Figure 7:
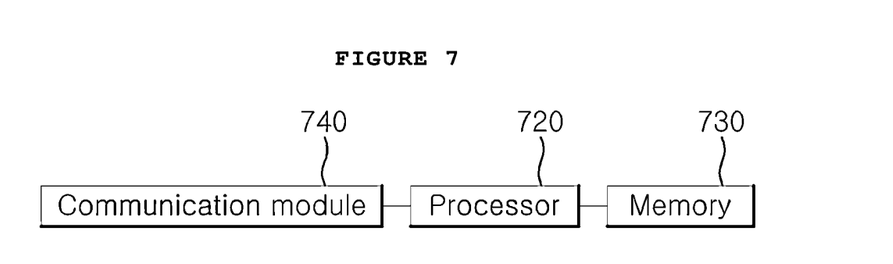
FIG. 7 is a block diagram illustrating an automatic switching communication device according to an embodiment of the present disclosure.

FIG. 7 is a block diagram illustrating an automatic switching communication device according to an embodiment of the present disclosure.

Referring to FIG. 7, the automatic switching communication device may include a processor 720, a memory 730, and a communication module 740.

The processor 720 according to an embodiment may include one processor core (single core) or a plurality of processor cores. For example, the processor 720 may include multi-core such as dual-core, quad-core, and hexacore. According to embodiments, the processor 720 may further include a cache memory located inside or outside the memory.

The processor 720 may be configured to obtain LTE communication state information of a main communication module 100 for communicating with the outside through a directional antenna and a sub-communication module 200 for communicating with the outside through a directional antenna, and register the LTE communication state information of the main communication module 100 and the sub-communication module 200 in a routing table, and determine whether the main communication module 100 and the sub-communication module 200 are capable of performing LTE communication, and compare with pre-specified communication quality coefficients of the main communication module 100 and the sub-communication module 200 to adjust a routing path.

The processor 720 may perform the automatic switching communication method according to the present disclosure in a volatile memory such as random-access memory (RAM), and may store a result of performing the method in a non-volatile memory such as read-only memory (ROM).

According to an embodiment, the memory 730 may include a hardware component for storing data and/or instructions input to and/or output from the processor 720. The memory 730 may include, for example, a volatile memory such as random-access memory (RAM) and/or a non-volatile memory such as read-only memory (ROM). The volatile memory may include at least one selected from a group of dynamic RAM (DRAM), static RAM (SRAM), cache RAM, and pseudo SRAM (PSRAM).

According to an embodiment, the memory 730 may store communication quality coefficients pre-specified by a user, and may transmit the stored communication quality coefficients to the processor 720 in response to an instruction.

According to an embodiment, the memory 730 may store a plurality of instructions set to perform the automatic switching communication method according to the present disclosure.

The communication module 740 may include the main communication module 100 and the sub-communication module 200. However, no limitation thereto is imposed. Various communication devices capable of establishing a communication channel to the outside and transmitting received data to the processor 720 may be used as the communication module 740 of the present disclosure. For example, the communication module 740 may include a plurality of communication modules, and each of the communication modules may be installed at a particular location on an aircraft or a ship and may perform the automatic switching communication method controlled by the automatic switching communication device.

According to an embodiment, the communication module 740 may include an LTE modem, a GPS module, and a Wi-Fi module, and may be electrically connected to the outside through a LAN and a WAN.

The description of the present disclosure described above is for illustrative purposes, and it will be understood by those skilled in the art that the present disclosure can be embodied in other specific forms without changing the technical idea or essential characteristics of the present disclosure. Therefore, it should be understood that the embodiments described above are illustrative in all aspects and not restrictive.

The scope of the present disclosure is characterized by the appended claims rather than the detailed description described above, and it should be construed that all alterations or modifications derived from the meaning and scope of the appended claims and the equivalents thereof fall within the scope of the present disclosure.

What is claimed is:

1. An automatic switching communication method, comprising:
    obtaining Long Term Evolution (LTE) communication state information of a main communication module for communicating with outside through a first directional antenna and a sub-communication module for communicating with the outside through a second directional antenna different from the first directional antenna;
    registering the LTE communication state information of the main communication module and the sub-communication module in a routing table;
    determining whether the main communication module and the sub-communication module are capable of performing LTE communication; and
    comparing with pre-specified communication quality coefficients of the main communication module and the sub-communication module to adjust a routing path.

2. The automatic switching communication method of claim 1, wherein an LTE interface of the main communication module is set to have a higher priority than an LTE interface of the sub-communication module.

3. The automatic switching communication method of claim 1, wherein the main communication module is electrically connected to the sub-communication module through a wide area network (WAN).

4. The automatic switching communication method of claim 1, wherein the sub-communication module has a demilitarized zone (DMZ) setting function of transmitting an external connection request to the main communication module.

5. An automatic switching communication device configured to perform an automatic switching communication method using a processor, the automatic switching communication device comprising:
    a main communication module configured to communicate with outside through a first directional antenna; and
    a sub-communication module configured to communicate with the outside through a second directional antenna different from the first directional antenna,
    wherein the processor is configured to
        obtain Long Term Evolution (LTE) communication state information of the main communication module and the sub-communication module,
        register the LTE communication state information of the main communication module and the sub-communication module in a routing table, and
        compare with pre-specified communication quality coefficients of the main communication module and the sub-communication module to adjust a routing path.

* * * * *